United States Patent
Leizerovich

(10) Patent No.: US 9,755,791 B2
(45) Date of Patent: Sep. 5, 2017

(54) EYE DIAGRAM ESTIMATION, BASED ON SIGNAL STATISTICS COLLECTION

(71) Applicant: MULTIPHY LTD., Ness-Ziona (IL)

(72) Inventor: Hanan Leizerovich, Petach Tikva (IL)

(73) Assignee: MULTIPHY LTD., Ness-Ziona (IL)

( * ) Notice: Subject to any disclaimer, the term of this patent is extended or adjusted under 35 U.S.C. 154(b) by 0 days.

(21) Appl. No.: 15/210,835

(22) Filed: Jul. 14, 2016

(65) Prior Publication Data
US 2017/0019219 A1    Jan. 19, 2017

Related U.S. Application Data

(60) Provisional application No. 62/192,608, filed on Jul. 15, 2015.

(51) Int. Cl.
*H04L 1/20* (2006.01)
(52) U.S. Cl.
CPC .................... *H04L 1/205* (2013.01)
(58) Field of Classification Search
CPC ........................................................ H04L 1/205
USPC ........................................................ 375/226
See application file for complete search history.

(56) References Cited

U.S. PATENT DOCUMENTS

| | | | |
|---|---|---|---|
| 7,324,903 B2* | 1/2008 | Cho | H04L 1/205 348/180 |
| 9,496,993 B1* | 11/2016 | Miller | H04L 1/205 |
| 2003/0112333 A1* | 6/2003 | Chen | H04N 17/004 348/192 |
| 2010/0017157 A1* | 1/2010 | Acharya | G01R 13/029 702/67 |

* cited by examiner

*Primary Examiner* — Helene Tayong
(74) *Attorney, Agent, or Firm* — FisherBroyles, LLP; Robert Kinberg

(57) ABSTRACT

Method and system for estimating an eye diagram display of a real signal passing through a data communication channel, according to which decoded symbols of the transmitted real signal are captured, along with their corresponding ADC sample values and sampled at a rate of 1 SPS or more. Then statistic data is collected for each captured sequence of bits/symbols for each particular phase and a synthetic signal is created, based on the collected statistics, using a signal generator that produces samples by randomly creating a bit stream by generating a corresponding one or more samples for any symbol sequences in the bit stream according to the number of collected phases. Interpolation on the corresponding samples is then performed, according to required display time resolution and the synthetic signal is then displayed as a two-dimensional eye diagram image, representing all the statistics collected at all phases.

13 Claims, 2 Drawing Sheets

EYE DIAGRAM ESTIMATION, BASED ON SIGNAL STATISTICS COLLECTION

CROSS-REFERENCE TO RELATED APPLICATION

This application claims the benefit of U.S. Provisional Application No. 62/192,608, filed Jul. 15, 2015, the disclosure of which is incorporated herein by reference in its entirety.

FIELD OF THE INVENTION

The present invention relates to the field of optical communication systems. More particularly, the invention relates to a method and system for estimating an eye diagram of a signal that passes a communication channel, based on signal statistics collection.

BACKGROUND OF THE INVENTION

An eye diagram is a methodology to represent and analyze high speed digital signals (such as optical and base band signals), their quality and the ability to perform clock and data recovery.

Some high-speed digital standards use a form of non-return to zero (NRZ) for the data coding where a high (positive) pulse represents a logic one and a low (negative) pulse a logic zero. Other standards use more complex waveforms (i.e., modulation schemes), such as PAM-4 or PAM-8. For all waveforms, the eye diagram allows parameters of the electrical quality of the signal to be visualized. The data eye diagram is constructed from a digital waveform by folding the parts of the waveform corresponding to each individual symbol into a single graph with signal amplitude on the vertical axis and time on horizontal axis. This construction is repeated over many samples of the waveform, the resultant graph will represent the average statistics of the signal and will resemble an eye. The eye opening corresponds to one symbol period and is typically called the Unit Interval (UI) width of the eye diagram. The eye diagram offers additional information beyond the time domain waveform display, including impairments such as attenuation, noise, crosstalk, etc. Eye Diagrams are typically used to characterize a high speed signal source or transmitter (receiver testing usually requires bit error rate testing).

Conventional techniques for generating an eye diagram of a digital signal require using testing instruments that receive a repetitive trigger from a clock, sample and plot the signal again and again on a display screen. Other techniques sample the signal in several phases, in order to complete the diagram. However, these techniques need a lot of information to capture the eye diagram (histogram per all the phases) and some may take a relatively long time to create.

It is therefore an object of the present invention to provide a system and method for estimating an eye diagram of a signal that passes a communication channel, based on signal statistics collection.

It is another object of the present invention to provide a system and method for estimating an eye diagram of a signal which do not need to store all the information of all the phases.

It is a further object of the present invention to provide a system and method for estimating an eye diagram of a signal that passes a communication channel, which does not require collection of data for long time periods.

Other objects and advantages of the invention will become apparent as the description proceeds.

SUMMARY OF THE INVENTION

The present invention is directed to a method for estimating an eye diagram display of a real signal passing through a data communication channel, according to which decoded symbols of the real signal, transmitted through the data communication channel are captured, along with their corresponding Analog to Digital Conversion (ADC) sample values and sampled at a rate of at least 1 SPS, where 1 SPS represents sampling at a single phase within a symbol and two or more SPS represent sampling at two or more phases within a symbol, respectively. Optionally, this step may be repeated several times, each time at a different phase relative to the clock point, to obtain samples at more phases within a symbol.

Then statistic data is collected for each captured sequence of bits/symbols for each particular phase and a synthetic signal is created, based on the collected statistics, using a signal generator that produces samples by randomly creating a bit stream by generating a corresponding one or more samples for any symbol sequences in the bit stream according to the number of collected phases. Interpolation on the corresponding samples is performed, according to required display time resolution and the synthetic signal is then displayed as a two-dimensional eye diagram image, representing all the statistics collected at all phases.

The collected statistics may be selected from the following group:
- the average and variance of the sampled signal corresponding to each bit/symbol sequence, based on Method of Moments;
- histograms that count how many times a specific ADC value is found upon the specific bit/symbol sequence.

The captured sequence may be known in advance (e.g., a Pseudorandom Binary Sequence), or may result from decoding the received signal using a symbol/bit decoder.

Before displaying the synthetic signal as a two-dimensional image, all the statistics collected at all phases may be jointly normalized, to achieve a dynamic range for image presentation.

The present invention is also directed to a system for estimating an eye diagram display of a real signal passing through a data communication channel, comprising:
a) circuitry for collecting sequence of bits/symbols of the real signal, which includes:
 a.1) a decoder for decoding the bits/symbols;
 a.2) a statistics collector (which may be implemented by a FIFO memory that collects the input signal samples and the decoded bits/symbols) for collecting statistics for each sequence of bits/symbols at a sampling rate of at least 1 SPS;
b) circuitry for creating a synthetic signal, based on the statistics collected by the statistics collector, including a signal generator that produces samples by randomly creating a bit stream by generating a corresponding one or more samples for any symbol sequences in the bit stream, according to the number of collected phases;
c) a signal generator for producing samples, based on the statistic collection performed;
d) a bit gathering circuitry, for gathering bits to symbols;
e) a memory for storing the produced samples;
f) a sample selector, for sending several consecutive samples as a result of each symbol sequence using interpolation; and g) a processor for generating an eye diagram for the real signal, based on the produced samples.

Signal generation is performed by randomly selecting a value from a histogram in the collected statistics or by producing a random variable with mean and variance according to the values collected by the statistics collector.

The bit stream may be produced by the bit stream generator is a fixed stream that is built to contain all possible symbol sequence combinations.

The statistic collection may be performed at different clock phases.

Interpolation on the samples of the synthetic signal may be performed according to the required display time resolution.

The decoder may be a modem that decodes the input samples into the symbols or the bits/symbols that created them, or a symbol synchronizer which delivers the symbols or bits to the data collector, synchronized to the corresponding samples.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein.

DETAILED DESCRIPTION OF PREFERRED EMBODIMENTS

Figure 1:
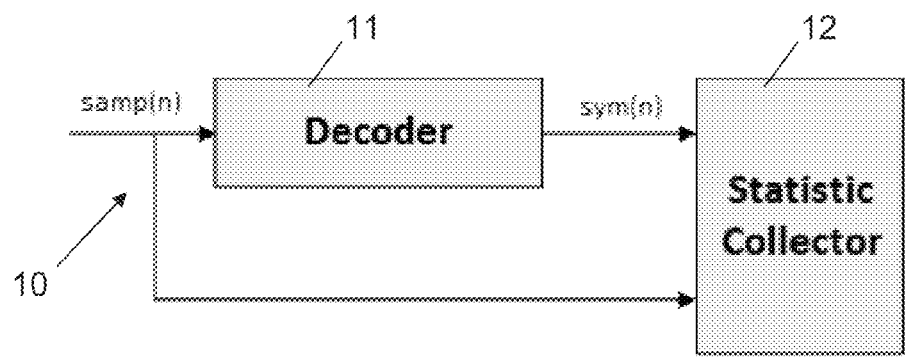
FIG. 1 shows a circuitry for collecting sequence of bits/symbols of the real signal.

The present invention proposes a system and method for estimating an eye diagram display, based on signal statistics. According to the proposed method, the real signal that passed a communication channel is represented by a synthetic signal, based on sampling the real signal at a relatively low rate of 1 SPS in as few phases as required to assure Nyquist rate. Then, the synthetic signal is represented as an eye diagram. This allows using a less complicated hardware for sampling, as well as collecting less information about the real signal. The signal statistics are based on symbol decoding and collection of moments (Method of Moments—a method of estimation of population parameters by collecting the average and optionally the variance of samples per symbol sequence) or histograms for each symbol sequence of N consequent symbols.

The method proposed by the present invention can present full eye diagrams based on "captures" of either short or long sequences of decoded symbols and their corresponding Analog to Digital Conversion (ADC) samples. These "captures" may be created by either consequent bursts of samples and symbols or consequent short bursts. This is based on the creation of a synthetic signal with the same statistics as the original "captured" signal and creating a histogram-based display of the eye diagram.

One way to identify optical signal quality for clock and data recovery and for data detection is by examining the eye diagram. The present invention proposes a method of collecting information and presenting the eye diagram, using analog-to-digital samples which are sampled at sample rate of 1 SPS. Sampling may be carried out either on a predefined long symbol/bit sequence (such as a Pseudorandom Binary Sequence PRBS—a binary sequence that, while generated with a deterministic algorithm, is difficult to predict and exhibits statistical behavior similar to a truly-random sequence), which is known in advance, or on a sequence resulting from decoding the received signal using a symbol/bit decoder. According to existing standards, it is possible to lock on the predefined long symbol/bit sequence, in order to know the BER of the communication channel. This allows knowing that the channel characteristics is represented by a sequence of N symbols (for example, N=10), such that each sequence of N symbols is sampled once. Then the system collects statistics about each sequence of 10 consecutive symbols, so as to know which value these 10 consecutive symbols gave. The system collects moments for each sequence of N symbols, while knowing the mean value and the variance of each sequence (assuming Gaussian distribution per symbol sequence). For example, if N=10, then for NRZ modulation scheme the number of bits is $2^{10}$, for PAM-4 the number of bits is $4^{10}$, etc.

One of the advantages proposed by the present invention is that there is relatively a small amount of collected data to present the eye diagram. Also, there is no need for obtaining long consequent data captures and high speed (more than 1 SPS) Analog to Digital Conversion (ADC).

The method proposed by the present invention includes the following steps:

Step 1—Data Collection

FIG. 1 shows a circuitry for collecting sequence of bits/symbols of the real signal. The circuitry 10 comprises a decoder 11 and a statistics collector 12, which collects statistics for each sequence of bits/symbols. The statistics collected the statistics collector 12 may be either average or variance of the sampled signal corresponding to each sequence of bits/symbols. Alternatively, the statistics collector 12 collects histograms that count how many times a specific ADC value is found upon the specific bit/symbol sequence. The statistics collector 12 may also be implemented by a simple FIFO memory that collects the input signal samples and the decoded bits/symbols.

The statistics collector 12 is adapted to perform the following calculations, to obtain the desired histograms:

$$\text{Hist}[\text{sym}(n) \ldots \text{sym}(n-K), \text{samp}] = \text{Hist}[\text{sym}(n) \ldots \text{sym}(n-K), \text{samp}] + 1$$

where n is the symbol index,
Hist[ ] is a large memory containing statistical information of each symbol sequence (how many times a specific sample occurred in a specific symbol sequence),
"sym(n)" to "sym(n−K)" is the K+1 known sequence of symbols in index n, "samp" is the equivalent sample that is affected by those symbols alone (due to Inter-Symbol-Interference).

Alternatively, if the Method of Moments is used, the statistics collector 12 is adapted to perform the following calculations:

$$M0[\text{sym}(n) \ldots \text{sym}(n-K)] = M0[\text{sym}(n) \ldots \text{sym}(n-K)] + 1$$

$$M1[\text{sym}(n) \ldots \text{sym}(n-K)] = M0[\text{sym}(n) \ldots \text{sym}(n-K)] + \text{samp}$$

$$M2[\text{sym}(n) \ldots \text{sym}(n-K)] = M0[\text{sym}(n) \ldots \text{sym}(n-K)] + \text{samp}^2$$

where,

M0 is the number of samples collected per each sequence of symbols.

M1 is the sum of the samples collected per each sequence of symbols.

M2 is the sum of the square samples collected per each sequence of symbols.

These three measures allow calculating mean and variance per symbol sequence.

Alternatively, if the statistics collector 12 is implemented by a FIFO memory, it is adapted to perform the following calculations:

FIFO1[addr]=sym(n)

FIFO2[addr]=samp(n)

addr=addr+1 where [addr] represents the current address

The decoder 11 may be any modem that decodes the input samples into the symbols or the bits/symbols that created them. In case when the input sequence is a predefined sequence, the decoder 11 may be a symbol synchronizer which delivers the symbols or bits to the data collector, synchronized to the corresponding samples.

The samples collection is carried out in a sampling rate of at least 1 SPS, and does not have to include all the samples. The samples collection should be performed again at different clock phases within a symbol, to allow data collection at a higher rate (to eventually get samples at Nyquist rate). Typically, one more sample collection at phase shifted by half a clock is enough to achieve 2 SPS samples.

Step 2—Signal Generation

Figure 2:
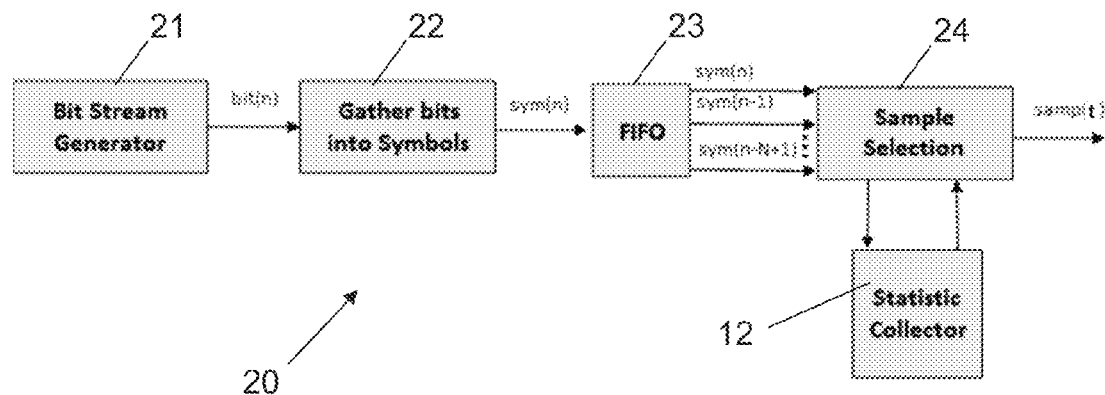
FIG. 2 shows a circuitry for generating a synthetic signal, based on sampling of the real signal.

FIG. 2 shows a circuitry for generating a synthetic signal, based on sampling of the real signal. The circuitry 20 includes a signal generator 21, a bit gathering circuitry 22 which gathers bits to symbols, a FIFO memory 23, a sample selector 24 and a statistics collector 12. Based on the statistic collection in step 1, the signal generator 21 produces samples to the next step. The signal can be generated by randomly creating a long bit stream and generating for any bit sequence in it by the corresponding sample. The signal generation can be performed by randomly selecting a value from the histogram or by producing a random variable with mean and variance according to the statistics collector 12.

The bit stream produced by the bit stream generator 21 may also be a fixed stream that is built to contain all possible symbol sequence combinations.

In case the statistic collection is performed at different clock phases, sample selector 24 (the circuitry that produces samples, or the "Sample Selection" circuitry) will send several consecutive samples as a result of each symbol sequence (using interpolation, which will be described below).

The sample selector 24 is adapted to perform the following calculations:

samp(t)=random variable with distribution Hist[sym(n) . . . sym(n−K:] using "phase ϕ" collection with t=n/Fs+ϕ, where 0<ϕ<1 and Fs is the symbols rate or samp(t)=known type (e.g., normal) random variable with distribution by M0[sym(n) . . . sym(n−K)], M1[sym(n) . . . sym(n−K)] and M2[sym(n) . . . sym(n−K)] using "phase ϕ" collection Average=M1/M0

Variance=M2/M0−(M1/M0)$^2$ with t=n/Fs+ϕ

Step 3—Interpolation, Filtering and Displaying an Eye Diagram

The next step is to perform interpolation on the new "samples" to the required display time resolution, filtering (if required) and to display the signal. Sampling at 1 SPS is done in a particular phase of the signal, which represents the sampling time relative to the clock. However, in order to improve the quality of the eye diagram, it is preferable to sample the signal at least at 2 different phases, so as to collect data and statistics at another phase, while keeping the same sampling rate of 1 SPS. The fact that the signal has been sampled in two phases allows recovering the signal using information which is based on 2 SPS. This allows using interpolation of sample values to more phases and by appropriate filtering, obtaining a more accurate eye diagram of the synthetic signal, which approximates the properties of the real signal.

According to the present invention, symbols of the real signal are captured, decoded, transmitted through the data communication channel, along with their corresponding Analog to Digital Conversion (ADC) sample values and sampled at a rate of at least 1 SPS, where 1 SPS represents sampling at a single phase within a symbol and two or more SPS represent sampling at two or more phases within a symbol, respectively. Optionally, this step may be repeated several times, each time at a different phase relative to the clock point, to obtain samples at more phases within a symbol.

Then statistic data is collected for each captured sequence of bits/symbols for each particular phase and a synthetic signal is created, based on the collected statistics, using a signal generator that produces samples by randomly creating a bit stream by generating a corresponding one or more samples for any symbol sequences in the bit stream according to the number of collected phases. Interpolation on the corresponding samples is performed, according to required display time resolution and the synthetic signal is then displayed as a two-dimensional eye diagram image, representing all the statistics collected at all phases.

Figure 3:
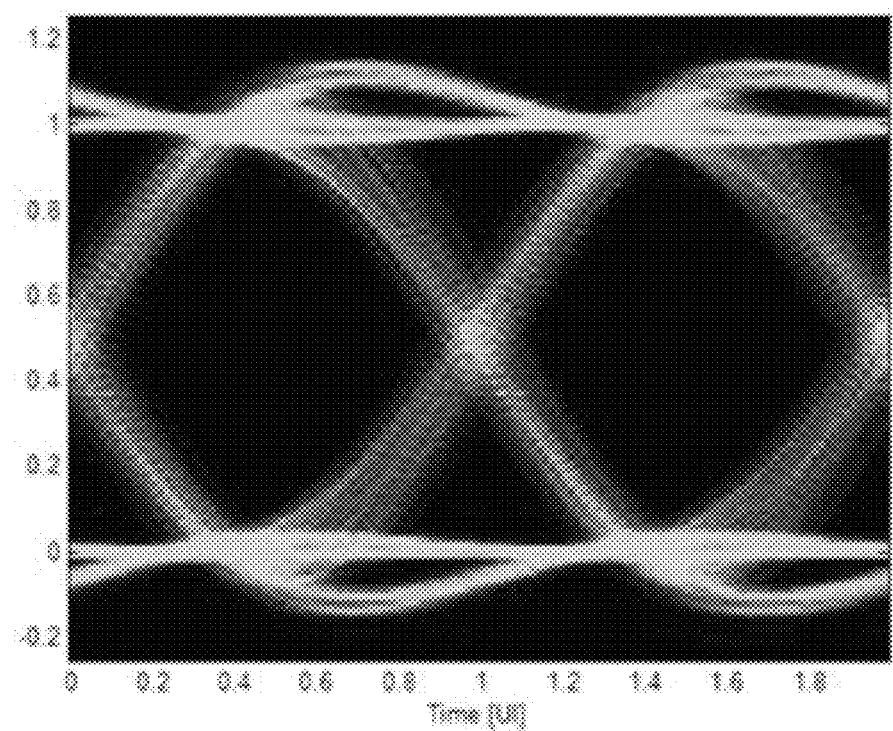
FIG. 3 illustrates an example of an eye diagram over 2 Unit Intervals, based on samples of the generated synthetic signal.

FIG. 3 illustrates an example of an eye diagram over 2 Unit Intervals, based on samples of the generated synthetic signal. The displayed eye diagram is actually a histogram per phase at the required ADC level resolution, which can be better resolution than 1 LSB. For each phase in the Unit Interval, a histogram of samples is collected. In case when a value of W is found in phase X, the level of cell H(X,Y) is increased by 1. Y is the closest value to W within the required resolution).

Eventually, the image H(X,Y), which indicates all the histograms at all the phases, can be jointly normalized to achieve a dynamic range for image presentation. As a result, a two dimensional (2-D) image is created, such that the X-axis is the phase in the Unit Interval (i.e., time intervals at better resolution than one UI) and the Y-axis is the ADC value at the wanted resolution. The image value at (X,Y) is the "probability" (normalized number of occurrences) of the ADC value Y at phase X.

In this eye diagram example, two consequent eye diagrams can be seen. The color represents the probability (number of occurrences) of the Y-axis ADC value at the phase in the X-axis. The highest probability is close to white, the lowest probability is close to black and probability changes from black to red to yellow to white, to indicate higher values.

According to another embodiment, instead of using collection of moments following sampling by an A/D converter, it is possible to set a predetermined threshold and to detect how many times this threshold has been exceeded, in order to build statistics. This data may be a basis for generating moments thereafter.

The above examples and description have of course been provided only for the purpose of illustration, and are not intended to limit the invention in any way. As will be appreciated by the skilled person, the invention can be carried out in a great variety of ways, employing more than one technique from those described above, all without exceeding the scope of the invention.

The invention claimed is:

1. A method for estimating an eye diagram display of a real signal passing through a data communication channel, comprising:
   a) capturing decoded symbols of said real signal, transmitted through said data communication channel, along with their corresponding Analog to Digital Conversion (ADC) sample values, sampled at a rate of at least 1 SPS, where 1 SPS represents sampling at a single phase within a symbol and two or more SPS represent sampling at two or more phases within a symbol, respectively;
   b) collecting statistics for each captured sequence of bits/symbols for each particular phase;
   c) creating a synthetic signal, based on the collected statistics, using a signal generator that produces samples by randomly creating a bit stream by generating a corresponding one or more samples for any symbol sequences in said bit stream, according to the number of collected phases;
   d) performing interpolation on the corresponding samples, according to required display time resolution; and
   e) displaying said synthetic signal as a two-dimensional eye diagram image representing all the statistics collected at all phases.

2. The method according to claim 1, wherein the collected statistics is selected from the following:
   the average and variance of the sampled signal corresponding to each bit/symbol sequence, based on Method of Moments;
   histograms that count how many times a specific ADC value is found upon the specific bit/symbol sequence.

3. The method according to claim 1, wherein the captured sequence is known in advance, or results from decoding the received signal using a symbol/bit decoder.

4. The method according to claim 3, wherein the captured known in advance sequence of bits/symbols is a Pseudorandom Binary Sequence (PRBS).

5. The method according to claim 1, further comprising jointly normalizing all the statistics collected at all phases, to achieve a dynamic range for image presentation, before displaying the synthetic signal as the two-dimensional eye-diagram image.

6. The method according to claim 1, wherein the step of capturing decoded symbols of the real signal that is sampled at the sampling rate of at least 1 SPS, is repeated several times, each time at a different phase relative to the clock point, to obtain samples at more phases within a symbol.

7. A system for estimating an eye diagram display of a real signal passing through a data communication channel, comprising:
   a) circuitry for collecting sequence of bits/symbols of said real signal, which includes:
      a.1) a decoder for decoding said bits/symbols;
      a.2) a statistics collector for collecting statistics for each sequence of bits/symbols at a sampling rate of at least 1 SPS;
      wherein 1 SPS represents sampling at a single phase within a symbol;
   b) circuitry for creating a synthetic signal, based on the statistics collected by said statistics collector, including a signal generator that produces samples by randomly creating a bit stream by generating a corresponding one or more samples for any symbol sequences in said bit stream, according to the number of collected phases;
   c) a signal generator for producing samples, based on the statistic collection performed;
   d) a bit gathering circuitry, for gathering bits to symbols;
   e) a memory for storing the produced samples;
   f) a sample selector, for sending several consecutive samples as a result of each symbol sequence using interpolation; and
   g) a processor for generating an eye diagram for said real signal, based on said produced samples.

8. The system according to claim 7, in which signal generation is performed by randomly selecting a value from a histogram in the collected statistics or by producing a random variable with mean and variance according to the values collected by the statistics collector.

9. The system according to claim 7, in which the bit stream produced by the bit stream generator is a fixed stream that is built to contain all possible symbol sequence combinations.

10. The system according to claim 7, in which the statistic collection is performed at different clock phases.

11. The system according to claim 7, in which interpolation on the samples of the synthetic signal is performed according to a required display time resolution.

12. The system according to claim 7, in which the statistics collector is implemented by a First input first output (FIFO) memory that collects the input signal samples and the decoded bits/symbols.

13. The system according to claim 7, in which the decoder is a modem that decodes input samples into the symbols or the bits/symbols that created them, or a symbol synchronizer which delivers the symbols or bits to the data collector, synchronized to the corresponding samples.

* * * * *